(12) United States Patent
Jo (10) Patent No.: US 10,733,230 B2
(45) Date of Patent: Aug. 4, 2020

(54) AUTOMATIC CREATION OF METADATA FOR VIDEO CONTENTS BY IN COOPERATING VIDEO AND SCRIPT DATA

(71) Applicant: Geun Sik Jo, Incheon (KR)

(72) Inventor: Geun Sik Jo, Incheon (KR)

(73) Assignee: INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 0 days.

(21) Appl. No.: 16/236,995

(22) Filed: Dec. 31, 2018

(65) Prior Publication Data

US 2020/0125600 A1 Apr. 23, 2020

(51) Int. Cl.
*G06F 16/783* (2019.01)
*G06K 9/00* (2006.01)

(52) U.S. Cl.
CPC ........ *G06F 16/784* (2019.01); *G06F 16/7834* (2019.01); *G06F 16/7844* (2019.01); *G06K 9/00248* (2013.01); *G06K 9/00369* (2013.01); *G06K 9/00375* (2013.01)

(58) Field of Classification Search
CPC .............. G06F 16/784; G06F 16/7844; G06F 16/7834; G06K 9/00248; G06K 9/00369; G06K 9/00375
USPC ........................................................ 386/241
See application file for complete search history.

(56) References Cited

U.S. PATENT DOCUMENTS

| | | | |
|---|---|---|---|
| 7,734,562 B1* | 6/2010 | Hairman | G10L 15/1822 704/250 |
| 8,818,037 B2* | 8/2014 | Noorkami | G06K 9/00744 382/103 |
| 9,600,717 B1* | 3/2017 | Dai | G06K 9/6217 |
| 10,445,762 B1* | 10/2019 | Ho | G06Q 30/0277 |
| 10,460,023 B1* | 10/2019 | Shriver | G06F 40/14 |
| 2004/0017513 A1* | 1/2004 | Takahashi | H04N 5/44513 348/552 |
| 2005/0022252 A1* | 1/2005 | Shen | G06K 9/00711 725/135 |
| 2007/0250901 A1* | 10/2007 | McIntire | H04N 7/17318 725/146 |
| 2011/0087703 A1* | 4/2011 | Varadarajan | H04N 21/23418 707/794 |
| 2018/0060699 A1* | 3/2018 | Ghazali | G06K 9/627 |

* cited by examiner

*Primary Examiner* — Loi H Tran
(74) *Attorney, Agent, or Firm* — Madeline F. Schiesser; Keohane & D'Alessandro, PLLC (57) ABSTRACT

Approaches presented herein enable automatic creation of metadata for contents of a video. More specifically, a video and a script corresponding to the video are obtained. A location corresponding to an object in at least one shot of the video is extracted. This at least one shot includes a series of adjacent frames. The extracted location is saved as an annotation area in an annotation knowledge base. An element of a plot of the video is extracted from the script. This element of the plot is derived from content of the video in combination with content of the script. The extracted element of the plot is saved in a narrative knowledge base.

18 Claims, 9 Drawing Sheets

AUTOMATIC CREATION OF METADATA FOR VIDEO CONTENTS BY IN COOPERATING VIDEO AND SCRIPT DATA

CROSS-REFERENCE TO RELATED APPLICATION

The present patent document claims priority to Korean Patent Application No. 10-2018-0124863, filed on Oct. 19, 2018, in the Korean Intellectual Property Office, the disclosure of which is incorporated herein by reference.

TECHNICAL FIELD

The present invention relates generally to automated metadata generation and, more specifically, to context analysis of video content and corresponding script.

BACKGROUND

Multimedia files, such as videos, can be associated with metadata describing information from the multimedia file or video itself, as well as relevant information from the multimedia or video. For example, the adaptive bitrate streaming technique Dynamic Adaptive Streaming over HTTP (DASH), a Moving Picture Experts Group (MPEG) video standard, uses Media Presentation Description (MPD), in which metadata is described by separating a video's segment information into layers, forming a suitable data model for media transmission. Other MPEG video standards include MPEG-4 Part 20, also known as MPEG-4 LASeR, and MPEG-7, which allow metadata capable of annotating location, size, appearance time, relevant information URLs, etc. of objects describing additional relevant video content information of in an XML format with video and audio multimedia.

Interactive videos are one example of utilizing metadata to describe relevant information in a video. In such interactive videos, objects in the video are augmented based on existing metadata with interactive capabilities, permitting an audience, for example, to click on such objects, revealing relevant additional information on the video, which can then instantly be learned by the audience, as well as shared by them. Currently, in order to create such interactive videos, a person must select a video of interest and separately obtain relevant information about a content of the video, and then manually create the video's metadata by annotating particular portions of the video with various information.

However, current techniques for creating metadata for interactive videos requires considerable time and cost. Additionally, relevant information about video contents, which will be added to the video as metadata, can be difficult to generate solely from a video in a video format. For example, even if characters or objects relevant to a story told in a video have been recognized, it remains difficult to designate a title for such characters or object or to infer a relationship between characters, objects, or events.

SUMMARY

Approaches presented herein enable automatic creation of metadata for contents of a video. More specifically, a video and a script corresponding to the video are obtained. A location corresponding to an object in at least one shot of the video is extracted. This at least one shot includes a series of adjacent frames. The extracted location is saved as an annotation area in an annotation knowledge base. An element of a plot of the video is extracted from the script. This element of the plot is derived from content of the video in combination with content of the script. The extracted element of the plot is saved in a narrative knowledge base.

One aspect of the present invention includes a method for automatically creating metadata for contents of a video, the method comprising: obtaining a video and a script corresponding to the video; extracting a location corresponding to an object in at least one shot of the video, the shot comprising an adjacent series of frames; saving the extracted location as an annotation area in an annotation knowledge base; extracting an element of a plot of the video from the script, the element of the plot being derived from content of the video in combination with content of the script; and saving the extracted element of the plot in a narrative knowledge base.

Another aspect of the present invention includes a computer system for automatically creating metadata for contents of a video, the computer system comprising: a memory medium comprising program instructions; a bus coupled to the memory medium; and a processor, for executing the program instructions, that when executing the program instructions causes the system to: obtain a video and a script corresponding to the video; extract a location corresponding to an object in at least one shot of the video, the shot comprising an adjacent series of frames; save the extracted location as an annotation area in an annotation knowledge base; extract an element of a plot of the video from the script, the element of the plot being derived from content of the video in combination with content of the script; and save the extracted element of the plot in a narrative knowledge base.

Yet another aspect of the present invention includes a computer program product for automatically creating metadata for contents of a video, the computer program product comprising a computer readable hardware storage device, and program instructions stored on the computer readable hardware storage device, to: obtain a video and a script corresponding to the video; extract a location corresponding to an object in at least one shot of the video, the shot comprising an adjacent series of frames; save the extracted location as an annotation area in an annotation knowledge base; extract an element of a plot of the video from the script, the element of the plot being derived from content of the video in combination with content of the script; and save the extracted element of the plot in a narrative knowledge base.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

To address the inadequacies in the current art discussed above, new techniques are needed that automatically generate video metadata based on a video script of the video and content of the video itself. Furthermore, to address the above discussed inadequacies, such automatic metadata generation techniques are needed to generate video metadata that includes various information items corresponding to a flow and a narrative of a video, such as identities of characters, their relationships to one another, and events having a cause or effect in the story. As such, the inventor of the present invention has developed a technical solution that offers several advantages over the preexisting art. Embodiments of the present invention offer techniques for extracting various information from the content of a video, techniques for extracting relevant information from a script of the video, and techniques for aligning the timing of the video and the video script. Embodiments of the present invention leverage these techniques to automatically create metadata containing information useful and of interest to a human viewer of the video from the video contents and video script. By tying this metadata to the aligned timing of the video and the video script, the value and usefulness of this metadata is increased.

Some embodiments of the present invention include a video processor that analyzes the contents of a video (e.g., item identification through object recognition and character identification through facial recognition), and that recognizes and organizes shots and scenes in the video to mutually connect with a video script as analyzed by a script processor. Some embodiments of the present invention can further include a script processor that analyzes content of a script corresponding to the video and that recognizes and organizes the script to mutually connect with the video as analyzed by the video processor. Some embodiments of the preset invention can further include an annotation knowledge base in which to save annotation metadata for a video shot/scene generated by the video processor, as well as a narrative knowledge base in which to save narrative metadata generated by the script processor.

According to some embodiments, the video processor can measure a similarity of each frame of an inputted video and, based on such, distinguish different shots in the video based on how drastically similarity deviates from established standards (i.e., an extent of differences). By detecting these different shots, the processor can further recognize points in the video where time and/or location/space changes, thus detecting and distinguishing between different scenes in the video.

According to some embodiments, the script processor can analyze a structured or semi-structured form of a script, and separate elements of the script, such as characters, speech, comments, locations, and time. The script processor can compare a dataset of various types of script forms against a form of an inputted script to identify an appropriate script form and structure, and verify that the inputted script follows such a script form. Further, script processor can recognize if an inputted form of a script is incorrect or has been incorrectly structured and, in such case, modify the script. This permits the script processor to be able to detect scenes from the structure of the script and designate the scenes in a hierarchy of metadata.

In order to align or synchronize the sequence of scenes between the video and the video script, speech of each scene in the video is used to create subtitles using techniques such as voice recognition or voice to text. Further, an algorithm for converting speech to a character string comparable to the script can be used to preliminarily line up the script with sections of the video having matching or substantially matching speech. Using a dynamic programming technique, the sequence of scenes between video and script can be better aligned. Further, a script content analysis process can be used to more meticulously align the script with the video, shot for shot, using scenes of video, shot time, and vocal text information.

Some embodiments of the present invention can include phases or steps. It should be understood that each step or phase may represent a module, segment, or portion of instructions, which comprises one or more executable instructions for implementing specified logical function(s). In some alternative implementations, the functions noted in the steps occur out of the order discussed here and below. For example, two phases described in succession may, in fact, be executed substantially concurrently, or the phases may sometimes be executed in the reverse order, depending upon the functionality involved. It will also be noted that each phase can be implemented by special purpose hardware-based systems that perform the specified functions or acts or carry out combinations of special purpose hardware and computer instructions.

In one phase of embodiments of the present invention, a video is inputted so that shots of the video are recognized using the video processor for eventual connection with the script processor. In another phase, a video script is inputted to permit recognition of the script and its scenes using the script processor for eventual connection with the video processor for comparison of the script with the video. In still another phase, recognized (preprocessed) video scenes and script scenes are lined up. In still another phase, the preprocessed video contents are analyzed. In yet another phase, the preprocessed script contents are analyzed. In still yet another phase, annotation metadata for video shot/sscenes is generated from the analyzed video contents and saved. In still another phase, narrative metadata is generated from the analyzed script contents and saved.

The phase in which a video is inputted so that shots of the video are recognized using the video processor for eventual connection with the script processor can be accomplished as follows in some embodiments. The video processor can, within a shot, designate a video frame as a key frame. The video processor uses the key frame as a reference point against which similarity to other frames can be judged. When other frames in the video show a drastic change from the key frame, the video processor can recognize a change in scene or shot. Furthermore, characters and objects can be recognized within a shot, using techniques such as object and facial recognition, and the appearance of characters (e.g., facial appearance/features) and the appearance objects can be identified, categorized, and saved as metadata.

The phase in which a video script is inputted to permit recognition of the script and its scenes using the script processor for eventual connection with the video processor for comparison of the script and video can be accomplished as follows in some embodiments. The script processor can divide the script into units, such as individual scenes. This division can be based on the script's structured hierarchy, which can be identified in a script shot extraction phase and through the input of additional information, such as script dialogue. As will be discussed in more detail below, the units of the script can be compared to shot information and vocal subtitles from the inputted video to ultimately align the video shots and script scenes, dividing them by units (e.g., shots and/or, scenes).

In the phase in which the video contents are analyzed, once characters and objects are recognized, at a frame captioning stage, relative positions of characters to other characters, characters to objects, and objects to other objects can be calculated and scenes described based on these relative positions. Further, at a scene captioning stage, actions are recognized, such as gestures and movements by a character and relative positions of the characters or objects to one another. Based on recognized pattern of actions, a character's activity can be classified (e.g., talking, arguing, running, driving, etc.). Based on such action classifications, a structure of the story (i.e., plot) of the video can be constructed, designated, and saved. Such various information is extracted from the video and saved as annotation metadata for video shots/scenes.

In the phase in which the preprocessed script contents are analyzed, the script is divided into shot units, similar to the shots in the video. Characters, spaces/locations, and objects included in the video script are analyzed and clustered along with information from the script to identify categories of such characters, spaces/locations, and objects. Relationships between characters can be drawn from, for example, how often two particular characters appear together in a single shot and relational terms exchanged between characters (e.g., family, friend, employer). Identities of objects mentioned in the script can be recognized by a title or name of the object. In some embodiments, one or more of characters, background, locations, objects, and relationships, can all be connected through a semantic web. At a dialogue analysis phase speech (e.g., spoken lines) is analyzed and parts of speech (POS), named entities, emotions, intent, acts of speech (e.g., utterances), tone, and/or honorifics are recognized and saved as metadata for speech. At a plot analysis phase, acts of speech are analyzed and conversation is broken into event-units. Further, relationships between events are analyzed. Such information is saved as narrative metadata.

There are several advantageous applications of embodiments of the present invention in which metadata is automatically created based on video contents, relevant information, and a structure of the video script for better understanding a plot of a story told through a video. For example, metadata is used with interactive videos and permits, based on a structure of the metadata, annotation of the video with particular information at particular timings. As such, embodiments of the present invention can be used in situations in which an end user is attempting to gain relevant information from video contents quickly and easily, without having to retrieve an outside source or review a significant portion of the video. Embodiments can also be applicable in cases of information retrieval concerning the contents of a video, in order to summarize a video from video contents. In another example, embodiments can be used to make a chatbot capable of conversations in which the chatbot identifies and discusses a context of scenes, conversations, and character dynamics seen in a video, based on information derived from the scene and from a context of the video overall.

Figure 1:
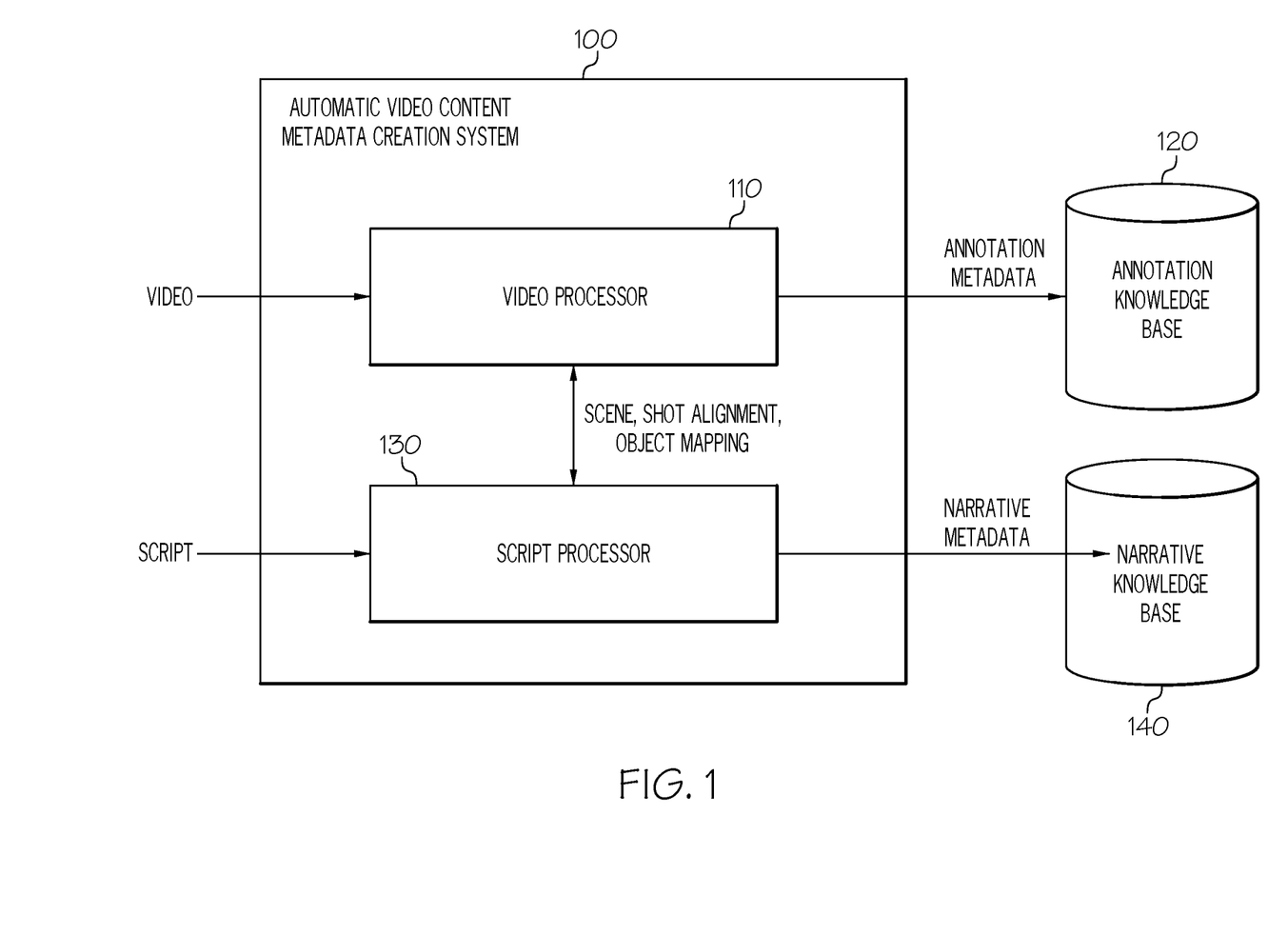
FIG. 1 shows a brief system architecture for an automatic video metadata creation from video content and script content system, according to illustrative embodiments.

Turning now to the Figures, the present invention will be discussed in further detail according to illustrative embodiments. Referring now to FIG. 1, a brief system architecture for an automatic video metadata creation from video content and script content system according to illustrative embodiments is shown. More specifically, FIG. 1 shows an automatic video content metadata creation system 100 (hereinafter "system 100"), according to some embodiments of the present invention. System 100 can create annotation metadata for the shots/scenes of an inputted video and narrative metadata from an inputted video and an inputted video script. To accomplish this, system 100 includes video processor 110 and script processor 130 which process the video and video script, respectively. In order to mutually connect the video and script, video processor 110 and script processor 130 perform a set of tasks, such as, but not limited to, aligning video and script scenes, preprocessing in anticipation of shot recognition and alignment, alignment of objects recognized from both the video and the script based on order of scenes, etc . . . . Annotation metadata for a video shot/scene can be saved within an annotation knowledge base 120. An example of such annotation data may include annotating a video shot with a description, such as "three people in a family sitting on a couch watching TV together." Video processor 110 can infer further annotation data, such as detecting in a subsequent shot that two of the family members in the above example are now shown out shopping, correlating this information to determine that only one family member is still on the couch watching TV, and adding an annotation to this effect to the subsequent shot. In some embodiments, such annotation metadata for a video shot/scene can be easily accessed via an uniform resource identifier (URI) based on a nature of the annotation knowledge base 120 as a data storage space based on Ontology language. Similarly, narrative metadata can be saved within a narrative knowledge base 130 and in some embodiments, such narrative metadata can be easily accessed via an URI based on a nature of the narrative knowledge base 140 as a data storage space based on Ontology language.

Video processor 110 can measure a similarity and/or difference between frames of an inputted video. In some embodiments, video processor 110 can measure this similarity/difference between every frame the inputted video, between adjacent frames of the video, between two frames selected periodically (e.g., two frames one second apart from one another), or between randomly selected frames. When video processor 110 detects little similarity between frames, that differences between frames are drastic, and/or that a frame differs greatly from an established standard frame, video processor 110 can determine that the frames are from different video shots. Video processor 110 can further determine, using such comparisons, the point in the video that the shot changes from a first shot to a second shot. It should be understood that a single scene in a video may be composed of several shots. Video processor 110 can then separate the video into different shots, based on each shot having frames that are determined to be part of the same shot as opposed to different shots.

Script processor 130 can analyze a semi-structured script form to separate the script into units, such as character, speech, description, location, and time. In some embodiments, in order to accomplish this, script processor 130 can reference a data set describing various script formats and compare a given, inputted script form against the reference script forms. Based on this comparison, script processor 130 can identify a correct script form and structure the inputted script according to the identified script form. In some embodiments, script processor 130 can also verify whether the inputted script form follows the identified format and, if an incorrect script form was identified, script processor 130 can modify the structure of the inputted script. This modification can include adding information learned from the video, such as a timestamp or a frame number of a key frame in a shot of a scene described in the script. Associating timestamps or frame numbers with the script permits fast and efficient retrieval of specific scenes and shots from the video. Script processor 130 can further detect scenes from the structured script and designate such scene structure information in a metadata hierarchy.

To align an order of scenes between video and script, video processor 110 can generate subtitles or a transcript (including timestamps) from spoken speech/audio in a scene using, for example, voice or speech recognition technology. System 100 can preliminarily line up identified scenes in the video with corresponding scenes in the video script by correlating the generated subtitles/transcript to a matching or near-matching line or other sound from a scene/shot in the script. System 100 can further, use a dynamic programming technique to align an order of scenes between the inputted video and video script. For further alignment of the video script with the video, by the unit of shot, temporal and vocal text information preprocessed from the script and video are sent to a script content analysis process, which will be described in more detail further below.

Figure 2:
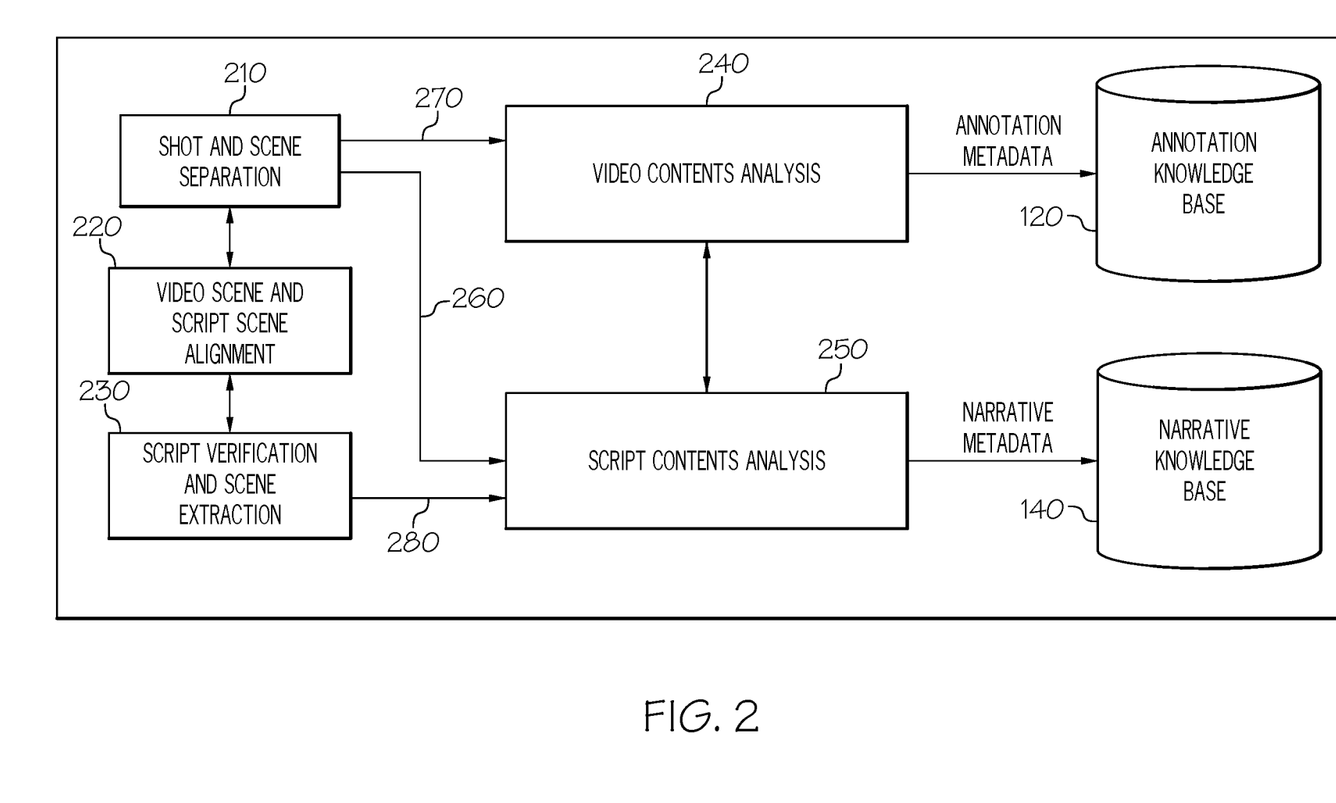
FIG. 2 shows a system structure for preprocessing video and video script content, according to illustrative embodiments.

Referring now to FIG. 2, a system structure for preprocessing video and video script content, according to illustrative embodiments, is shown. As described above, some embodiments of the present invention can include phases or steps. In one phase of embodiments of the present invention, a video is inputted so that shots of the video are recognized using the video processor for eventual connection with the script processor. In another phase, a video script is inputted to permit recognition of the script and its scenes using the script processor for eventual connection with the video processor for comparison of the script and video. In still another phase, recognized video scenes and script scenes are lined up. In still another phase, the preprocessed video contents are analyzed. In yet another phase, the preprocessed script contents are analyzed. In still yet another phase, annotation metadata for a video shot/scene is generated from the analyzed video contents and saved. In still another phase, narrative metadata is generated from the analyzed script contents and saved. These phases will be better understood with reference to FIGS. 2 through 5.

Referring to FIG. 2, video shots and scenes separation 210, script verification and scene extraction 230, and preliminary video scene and script scene alignment 220, each described initially above with respect to FIG. 1 and in more detail below with respect to FIG. 2, form an initial preprocessing portion of embodiments of the present invention.

At shot and scene separation 210, video processor 110 (FIG. 1) can measure a similarity or difference between two or more frames of an inputted video and detect frames at which this similarity decreases or the difference increases. To accomplish this, a shot boundary detection technique can be applied to the video to extract such frames as shots of the video. In such separated shots of the video, points (i.e., frame and timestamp) where time and/or location changes are detected and used to extract individual shots from the video.

At script verification and scene extraction 230, script processor 130 (FIG. 1) can analyze a semi-structured script format to separate or categorize the script into units, such as character, speech, comments/description, location, and time. In some embodiments, in order to accomplish this, script processor 130 can reference a data set describing various script formats and compare a given, inputted script form against the reference script forms. Based on this comparison, script processor 130 can identify an optimal or ideal script format for the video script to permit efficient processing. Script processor 130 can further structure the script, by assigning text in the script to particular categories or roles, such as dialogue, character identifiers, location/time indicators, and directions (e.g., blocking). Script processor 130 can also, in some embodiments, verify that the inputted script follows the selected format, and, in the case that there is a structuring error, modify the script or assigned categories/roles to correctly structure the script. For example, in the case that a section of the script reads, as a result of structuring, "character/person's name" followed by "character/person's name," instead of reading "character/person's name" followed by "speech," in that order, video processor 130 can modify the script. Script processor 130 can further detect scenes from the structure of the script and designate such scene structure information in a metadata hierarchy.

As such, after video processor 110 performs shot and scene separation 210 and script processor 130 performs script verification and scene extraction 230, system 100 can perform video scene and script scene alignment 220, aligning the order of video and script scenes with one another. To align the order of scenes between video and script, video processor 110 can generate subtitles or a transcript (optionally including timestamps) from spoken speech/audio in a scene using, for example, and voice or speech recognition technology or speech to text technology. In some embodiments, system 100 can also recognize and include in the subtitle or transcript non-vocal sounds, such as sound effects. System 100 can preliminarily line up identified scenes in the video with corresponding scenes in the video script by correlating the generated subtitles/transcript to a matching or near-matching line, other speech, or described sound effect from a scene in the script. System 100 can further use a dynamic programming technique to align an order of scenes between the inputted video and video script. However, a video script generally only breaks down a story by scene, whereas a video may have many shots in the same single scene. As a result, at this point, although a group of extracted shots are preliminary aligned with an extracted scene, precise alignment of the order and timing of shots to the video script remains difficult. As such, as will be described in more detail below with respect to FIGS. 3 and 4, in order to precisely align the script with individual shot units from the video within a scene described in the script, temporal information and text/transcripts of vocal information 260 are sent to script content analysis process 250, along with preprocessed structured script hierarchy 280. Furthermore, preprocessed video shot/scene hierarchy/structure 270 is sent to video content analysis process 240 for extraction of various information from the video and script.

Figure 3:
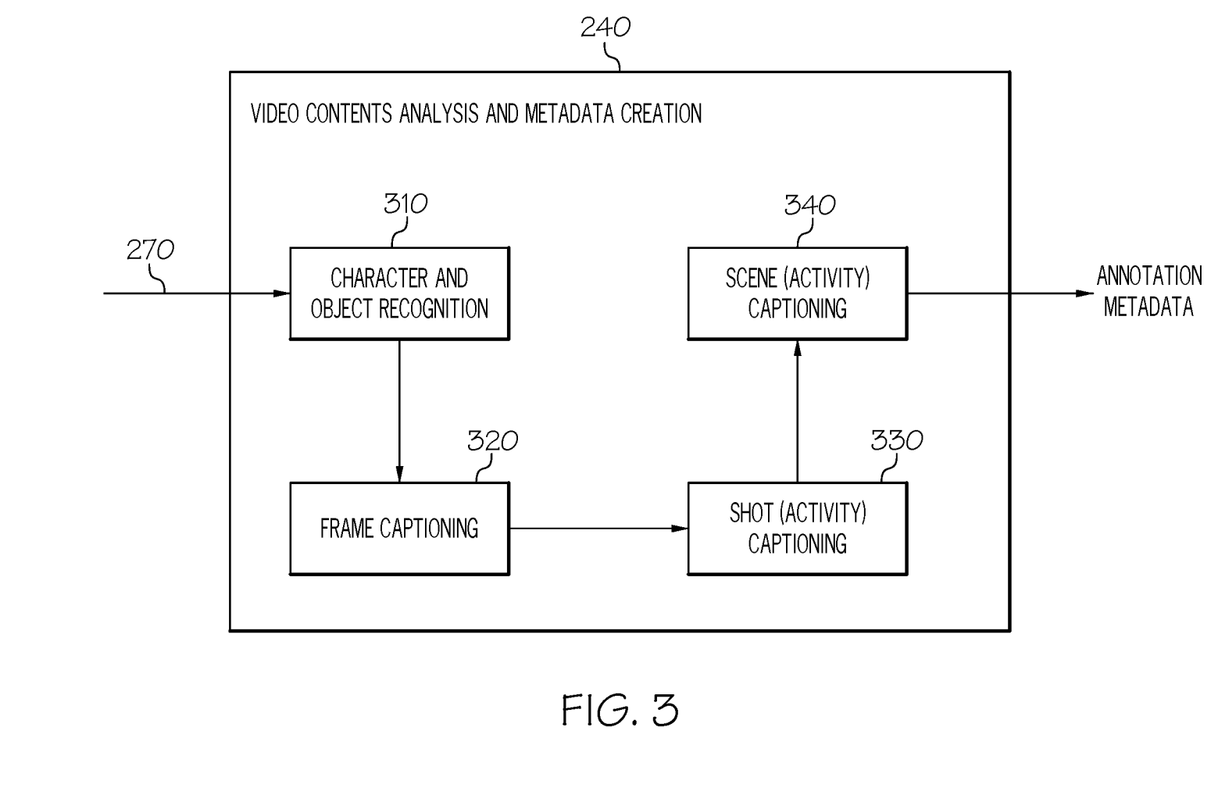
FIG. 3 shows a process flow for video content analysis and automatic creation of annotation metadata for a video shot/scene, according to illustrative embodiments.

Referring now to FIG. 3, a process flow for video content analysis and automatic creation of annotation metadata for a video shot/scene, according to illustrative embodiments, is shown. During video content analysis process 240, system 100 performs a character and object recognition process on preprocessed video shot/scene hierarchy/structure 270. System 100 can perform this process using techniques such as object recognition for item identification and facial recognition for character identification. System 100 identifies the first and last frames of a shot (i.e., a period in the video capped by a significant change in the similarity of frames) and at least one or more intermediate frames from within the shot at character and object recognition 310. System 100 can designate one or more intermediate frames as a key frame, which is representative of the frames in that shot. For example, a shot may show two characters talking to one another while facing each other. Most frames in the shot will be substantially similar as the characters remain relatively still. Thus, any intermediate frame from this shot would be representative of the characters' positions in the shot. Within the key frame, system 100 can identify an outline or shape/contour of one or more characters/persons, facial features of one or more characters/persons, as well as the shape/outline of an item within the shot and the item's category or identity. System 100 can store the recognized identities or categories of characters/people and objects and the locations/positions within the video of the same as annotation metadata for shots/scenes of the video. At frame captioning 320, if one or more characters and/or objects are recognized, system 100 recognizes not only the character/object's position, but also relative positions between character and character; character and object, and/or object and object. Furthermore, in the case that one or more characters are recognized, system 100 can use, for example, the character's arms, legs, and body positions and/or appearance to recognize a character pose and the poses' underlying meaning (e.g., angry, sad) and, based on such poses, describe the scene in the annotation metadata for the video scene. At shot (activity) caption 330, system 100 can recognize action within the shot based on the above identified characters and objects as well as the poses and relative positions of the characters and/or objects to one another. Finally, at scene (activity) captioning 340, system 100 can recognize an activity of a character or object across a set of shots forming a scene based on the recognized cumulative actions of the character or object in the shots. System 100 can designate these actions as events playing a role in an overall story of the video. Further, system 100 can assign each event to a story-oriented structure, which is stored as annotation metadata for video shots/scenes.

Figure 4:
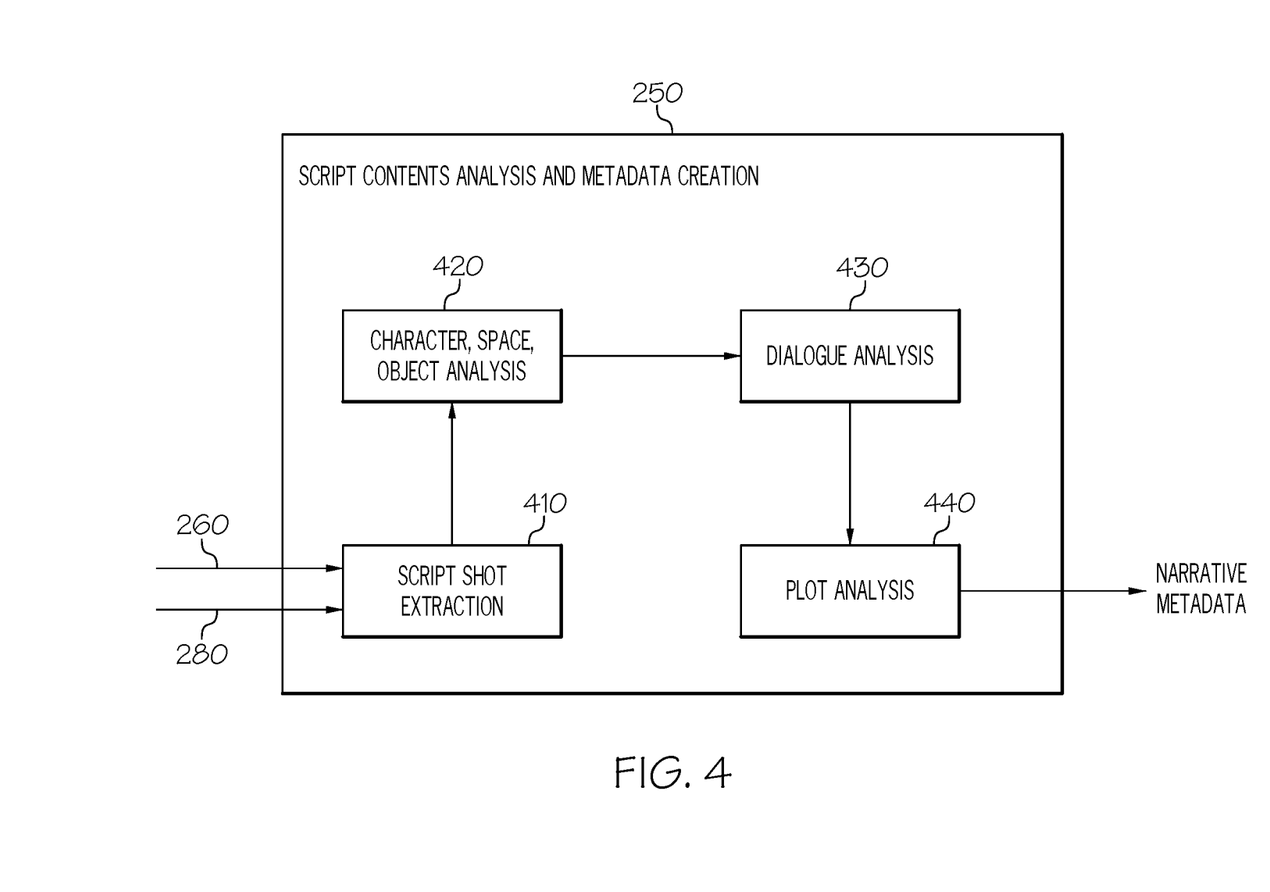
FIG. 4 shows a process flow for script analysis and automatic creation of narrative metadata, according to illustrative embodiments.

Referring now to FIG. 4, a process flow for script analysis and automatic creation of narrative metadata, according to illustrative embodiments, is shown. At script shot extraction 410, system 100 uses two primary inputs to initiate script analysis 250. The first is preprocessed structured script hierarchy 280 and any additional information, including script and scene information. Preprocessed structured script hierarchy 280 provides a version of the video script in which the script is broken down into scene units and inputted into a hierarchical script structure. The second input is temporal information and text/transcripts of vocal information 260 from the preprocessing of the video. This permits speech (e.g., dialogue) from the video and speech from the script to be compared and aligned, enabling the script to be broken down not merely by scene, but by individual shot units. After system 100 breaks down the script into individual shots, like the video itself, at 420, system 100 can perform character, space, and object analysis on characters, spaces/locations, and objects appearing in the video by clustering and categorizing characters, spaces/locations, and objects that appear together. For example, in the case of a character/person, system 100 can count the number of times the two particular characters appear together in a shot to extrapolate the relationship between the characters. Furthermore, system 100 can entity-link recognized/categorized objects, appearing characters, background information, and spaces/locations in a semantic web. This semantic web permits a cross-correlation of information, enabling a higher understanding of the characters and story/plot depicted in a video. At dialogue analysis 430, system 100 analyzes dialogue from the video and script; parts of speech (POS), named entities, emotions, intent, acts of speech (e.g., utterances), tone, and/or honorifics are recognized and saved as metadata for speech. Subsequently, at plot analysis 440, system 100 can analyze acts of speech and break down conversations into event-units, categorizing these events. Further, system 100 can analyze relationships between events, linking events through chains of cause and effect and a linear narrative. System 100 can save such information as narrative metadata.

Figure 5:
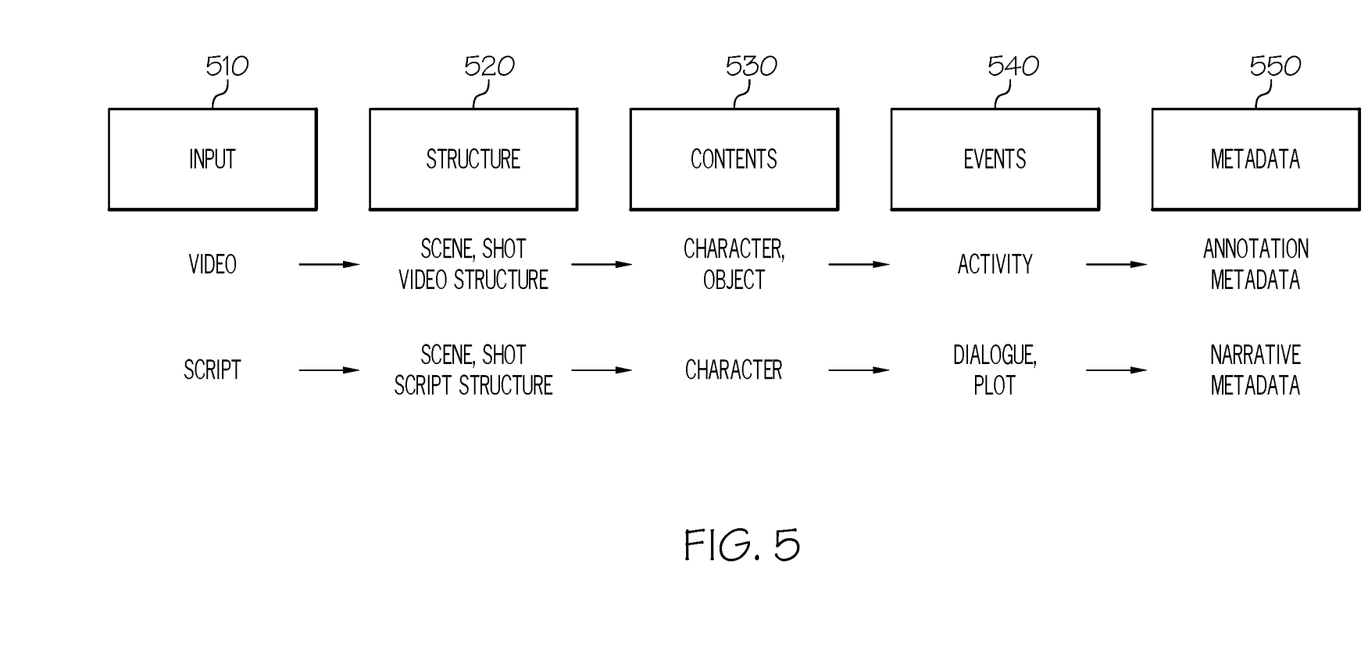
FIG. 5 shows a flowchart illustrating a progressive accumulation of metadata in an automatic video content metadata creation process, according to illustrative embodiments.

Referring now to FIG. 5, a flowchart illustrating a progressive accumulation of metadata in an automatic video content metadata creation process, according to illustrative embodiments, is shown. At 510, a video and a corresponding script are inputted into automatic video content metadata creation system 100. At 520, the script is structured and a hierarchy of the video and script are analyzed to extract information about shots and scenes respectively therein. At 530, various information from the video and the script is recognized and extracted to add content information to the structural information already derived from the video and script. At 540, properties of speech/dialogue are analyzed to uncover a story depicted in the video and script, and events, both within individual shots and scenes, as well as spanning the video are recognized and characterized. At 550, from the forgoing analyses, annotation and narrative metadata is generated and added to an annotation and narrative knowledge base, respectively.

Figure 6:
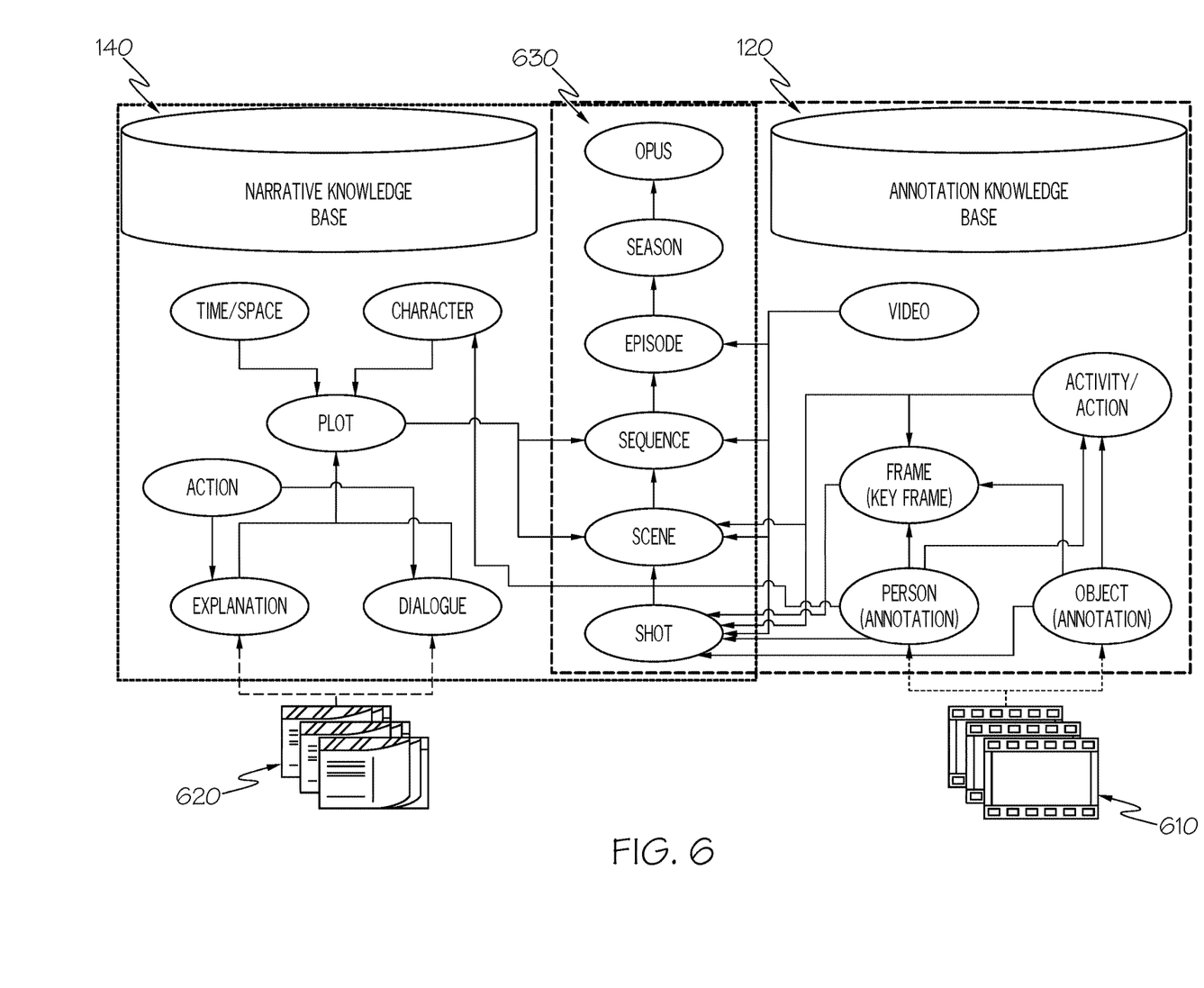
FIG. 6 shows an illustration of an annotation knowledge base and a narrative knowledge base, according to illustrative embodiments.

Referring now to FIG. 6, an illustration of an annotation knowledge base and a narrative knowledge base, according to illustrative embodiments, is shown. As shown in the Figure, annotation knowledge base 120 can include a semantic web interconnecting information to be used to generate video annotations extracted from video 610, including an identity of and annotation areas for characters/persons based on a location of the character/person in frames of a shot, an identity of and annotation areas for objects/items based on a location of the object/item in frames of a shot, a breakdown of a key frame of a shot (including, for example positions of objects/characters within the frame), and activity/actions taking place within a shot (e.g., gestures, movements, and a significance of these). One or more videos can further be included in annotation knowledge base 120. As can be further seen in FIG. 6, narrative knowledge base 140 can include a semantic web interconnecting information to be used to provide narrative information extracted from script 620 to a human viewer of the video. The information in the semantic web of narrative knowledge base 140 can include dialogue and other sound effects, a learned plot of the video, identities and relationships of characters in video 610 and script 620, actions performed by and around characters, time/space/locations of events in script 620, and explanations (e.g., summaries) of points (e.g., actions of characters, backgrounds of characters, previous plot, etc.) within the narrative. The semantic webs in knowledge bases 120 and 140 permit extracted video and script information to be correlated and connected, permitting a cognitive understanding of information extracted from script 620 and video 610. It is based on this structured knowledge that augmentations revealing important narrative, character, etc. information can be automatically created and populated into video 610.

Although embodiments thus far have been described in terms of a single video, it should be understood that embodiments of the present invention can be extended to a group of videos, such as a TV series (e.g., a soap opera) or a movie franchise (e.g., a trilogy). According to some embodiments, system 100 can treat a group of videos and their scripts in the same manner in which system 100 analyzes an individual video and the video's script. As system 100 examines a video as individual shots, a group of shots from across a group of videos can be analyzed the same as a group of shots from a single video. Shots can form but the basis of video hierarchy 630, in which a group of shots may form a scene, a group of scenes may form a sequence, a group of sequences may form an episode, a group of episodes may form a season, and a group of seasons may form an overreaching opus of an entire TV series or movie franchise. As such, in some embodiments, system 100 can populate annotation knowledge base 120 and narrative knowledge base 140 with information from across episodes, seasons, or even an overreaching opus of an entire TV series or movie franchise Particularly in cases of multipart videos (i.e., TV episodes, movie franchises), but not limited to such, it is sometimes desirable to prevent revelation of narrative information revealed later (also known as "spoilers") in a video or in a subsequent video to a human viewer. In such cases, system 100 can include narrative information that is reveled later in a series (e.g., the villain is the hero's long-lost father) in the narrative metadata stored in narrative knowledgebase 140, and configure such "spoiler" narrative information with a spoiler tag. This spoiler tag can, in the event such information is requested by the viewer or an annotation available to the viewer, cause a spoiler warning to be presented to the human viewer prior to reveling such spoiler narrative information to the viewer in the case that the viewer is watching a section of a video with a timestamp prior to the revelation of such information in the video.

Figure 7:
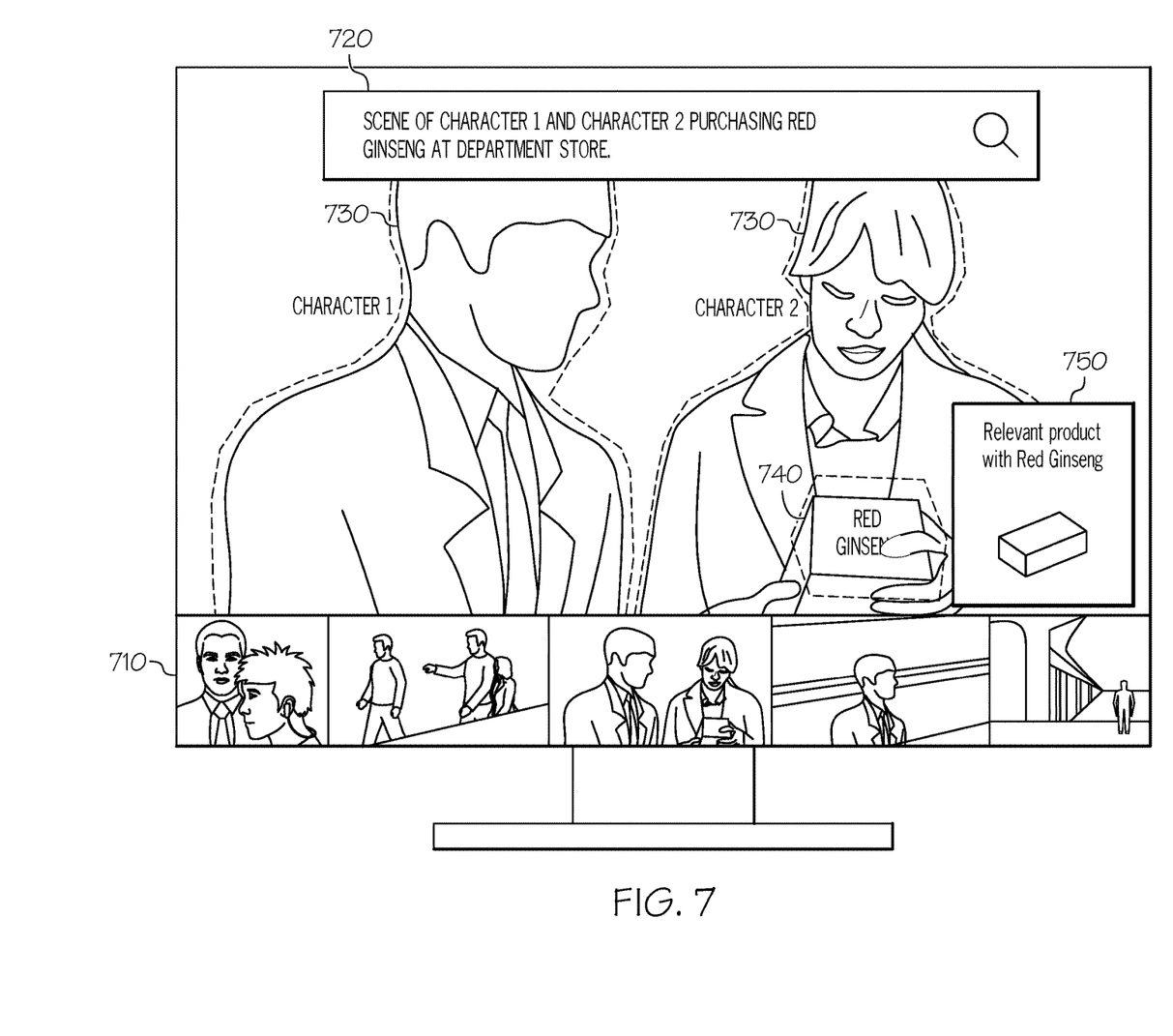
FIG. 7 shows an example of an application of metadata created from video and video script contents, according to illustrative embodiments.

Referring now to FIG. 7, an example of an application of metadata created from video and video script contents, according to illustrative embodiments, is shown. In this example, using the information from previously automatically generated narrative metadata (described above with respect to FIG. 4), a video player system can extract and display main scenes 710 for a story told within a video as thumbnails on a sliding bar. In this embodiment, a user may click on a scene of interest from the story and play the relevant scene. In a search bar 720 on a top of a display, the user may search for information about the story, characters, objects, etc. from the video. In embodiments in which a natural language query is permitted instead of a reserved word, a search component of system 100 or the video player can automatically extract from the natural language query keywords, such as character names, places, and behaviors, through morphological analysis and object name recognition. The search component can further automatically generate a SPARQL query with which to search the narrative knowledge base and a SPARQL endpoint to retrieve a particular item of information from the annotation knowledge base as an annotation or augmentation to be displayed on top of the (playing) video. The video player can further obtain a scene corresponding to the retrieved information and display/play the corresponding scene on display screen 710. According to embodiments of the present invention, information associated with content of the video can be formatted as an annotation for display over the video as an interactive augmented object. In some cases, this information may be a summary of a scene in question, in which case a synopsis of the scene, derived from the automatically generated narrative metadata can be displayed in search bar 720 or another text field area.

As shown in the example of FIG. 7, an indicator, such as an outline of a recognized character or object and a name 730 of that character or a name 740 of that object can be displayed on a display screen to indicate that the character or object is a clickable interactive augmented object. In this embodiment, when the clickable interactive augmented object over a character is clicked, a user can see additional information about the character, such as an identify of that character, a relationship between that character and another character, a scene related to that character, an event, etc. When the clickable interactive augmented object over an object/item is clicked, in some embodiments, an identity or a meaning or significance of the object/item to the story can be displayed at the interactive augmented object. In some other embodiments, in the case that the same type of object/item or a similar object/item is available for purchase online or in a physical retailer, interactive augmented advertisement object 750 can be displayed. In some embodiments, interactive augmented advertisement object 750 can offer a user the option to purchase the advertised object/item immediately, within the interactive augmented advertisement object 750. In some other embodiments, interactive augmented advertisement object 750 can direct a user to a place, online or in the real world, where the object/item can be purchased or otherwise obtained.

Figure 8:
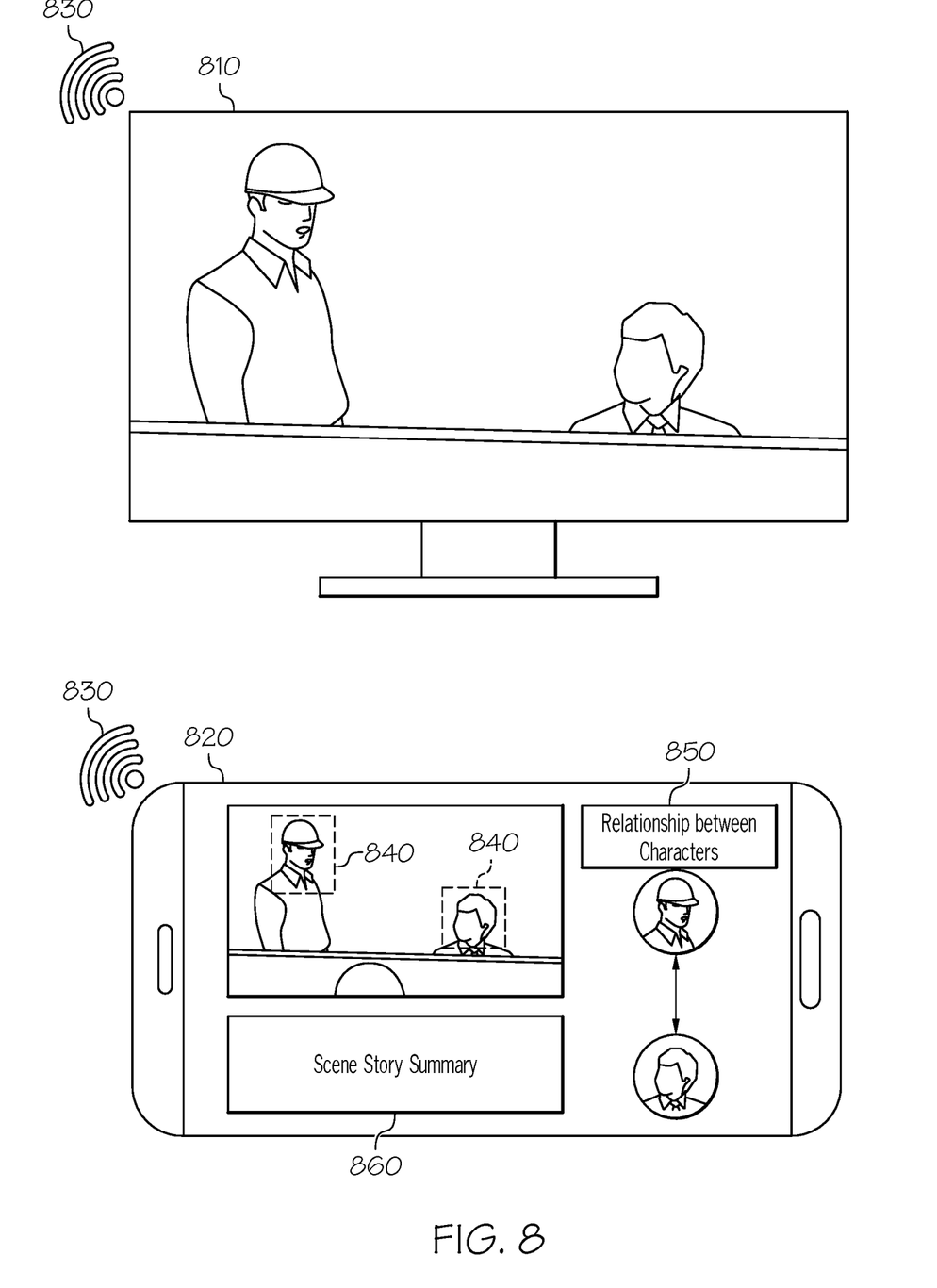
FIG. 8 shows another example of an application of metadata created from video and video script contents, according to illustrative embodiments.

Referring now to FIG. 8, another example of an application of metadata created from video and video script contents, according to illustrative embodiments, is shown. More specifically, in this example, in an N-screen environment, TV screen 810 plays, using a video playback program, a video from which system 100 previously automatically generated annotation and narrative metadata. As the video plays on TV screen 810, the video is also simultaneously or concurrently played on mobile device 820. Mobile device 820 can be configured to synchronize the video playing on TV screen 810 with the video playing on mobile device 820 in real time using socket communication 830. According to some embodiments of the present invention, mobile device 820 can be configured to display story information related to the synchronized video on the mobile device in synchronism with the video on TV screen 810.

In one example of such displayed story information related to the synchronized video, face bounding boxes 840 can be overlaid on the video displayed on mobile device 820 to mark a face of a person who is important in the story in a particular scene between characters appearing in the video, as indicated in the annotation metadata for that video scene. Another example of such displayed story information related to the synchronized video includes summaries of video story information from the narrative metadata, such as character relationships 850 and scene story summary 860. Display of character relationships 850, particularly of characters of importance in the video's story, permits easy recognition of the story of the video by a human viewer and understanding of relationships between different characters by this viewer. Scene story summary 860 summarizes a particular scene using the narrative metadata that was created based on that particular scene. By directly providing access to additional story information related to the synchronized video on mobile device 820, a human viewer may be permitted to learn such additional information without having stop the video from playing and then search the Internet for the particular information. Instead, directly providing access to story information related to the synchronized video on mobile device 820 creates a seamless viewing experience for the user.

Figure 9:
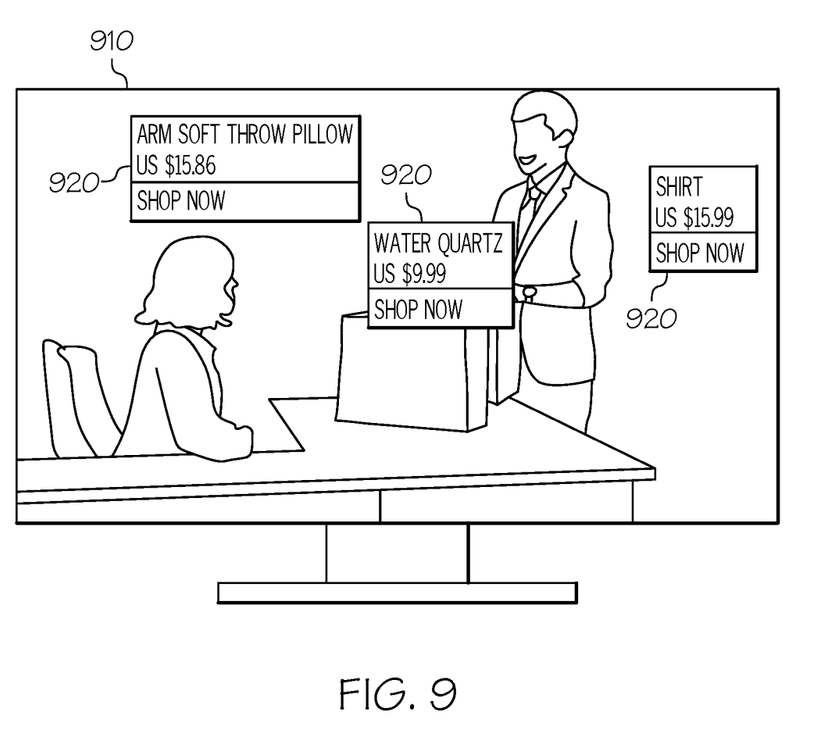
FIG. 9 shows still another example of an application of metadata created from video and video script contents, according to illustrative embodiments.

Referring now to FIG. 9, still another example of an application of metadata created from video and video script contents, according to illustrative embodiments, is shown. Upon creation of annotation metadata for a video shot/scene, one or more objects/items in a key frame image 910 are recognized, and an appearance and disappearance time of the object and a position of the object are recognized and stored as annotation metadata for that video shot/scene. By retrieving stored metadata related to a video and objects in the video, such as the time, location, size, and appearance of the object in key frame 910, system 100 or a video player can augment the video with the information contained in such metadata, enhancing the information communicated in the video. On frames between key frames, augmentations are placed based on an approximate position and size determined through interpolation by the video processor. Interpolation can be used to estimate the object's size and position at a point in time between the time points of the key frames by finding a median or intermediate value of the object's position and size between those time points. This permits an annotation to exist in every frame, instead of merely key frames. In some embodiments, the information associated with an object/item (e.g., a gift) can include product marketing/advertisement 920 of the same type of object/item or an object/item similar to the object appearing in the video. This can be accomplished by displaying object/item information related to the current scene. Furthermore, in some embodiments, several different product offerings can be stored in the narrative metadata and a particular product can be offered according to the user (e.g., based on purchase history, previous interests in certain advertisements, etc.).

The apparatus described above may be implemented as a hardware component, a software component, and/or a combination of hardware components and software components. For example, the apparatus and components described in the embodiments may be implemented within a computer system, such as, for example, a processor, a controller, an arithmetic logic unit (ALU), a digital signal processor, a microcomputer, a field programmable array (FPA), a programmable logic unit (PLU), a microprocessor, or any other device capable of executing and responding to instructions. The processing device may execute an operating system (OS) and one or more software applications that are executed on the operating system. The processing device may also access, store, manipulate, process, and generate data in response to execution of the software. For ease of understanding, the processing apparatus may be described as being used alone, but those skilled in the art will recognize that the processing apparatus may have a plurality of processing elements. For example, the processing apparatus may comprise a plurality of processors or one processor and one controller. Other processing configurations, such as a parallel processor, are also possible.

The software may comprise a computer program, code, instructions, or a combination of one or more of the foregoing, and may be configured to configure the processing apparatus to operate as desired or to command the processing apparatus independently or collectively. Software and/or data may be stored on any type of machine, component, physical device, virtual equipment, computer storage media, or device, such as a computer readable recording device. The software may be distributed over a networked computer system and stored or executed in a distributed manner. The software and data may be stored on one or more computer readable recording media.

The method according to an embodiment can be implemented in the form of a program command that can be executed through various computer means and recorded in a computer-readable medium. The computer-readable medium may include program instructions, data files, data structures, and the like, alone or in combination. The program instructions recorded on the medium may be those specially designed and constructed for the embodiments or may be available to those skilled in the computer software. Examples of computer-readable media include magnetic media such as hard disks, floppy disks and magnetic tape; optical media such as CD-ROMs and DVDs; magneto-optical media such as floppy disks; magnetooptical media, and hardware devices specifically configured to store and execute program instructions such as ROM, RAM, flash memory, and the like. Examples of program instructions include machine language code such as those generated by a compiler, as well as high-level language code that can be executed by a computer using an interpreter or the like.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

While the present invention has been described in connection with what is presently considered to be the most practical and preferred embodiments, it is to be understood that the invention is not limited to the disclosed embodiments, but, on the contrary, is intended to cover various modifications and similarities. For example, it should be understood that the techniques described may be performed in a different order than the described methods, and/or that components of the described systems, structures, devices, circuits, are replaced by an equivalent. It should be clearly understood that many variations and/or modifications of the basic inventive concepts herein taught, which may appear to those skilled in the pertinent art, will still fall within the spirit and scope of the present invention, as defined in the appended claims. Therefore, other implementations, other embodiments, and equivalents to the claims are within the scope of the following claims.

What is claimed is:

1. A method for automatically creating metadata for contents of a video, the method comprising:
    obtaining a video and a script corresponding to the video;
    recognizing an object in a key frame of at least one shot of the video, the shot comprising an adjacent series of frames;
    extracting a location corresponding to the object in the at least one shot;
    interpolating a position of the object in a set of intermediary frames between two key frames or a key frame and a boundary frame of the shot;
    recognizing an action within the shot based on a pose or positions of an object in the shot;
    saving the object, position of the object, and action of the object as an annotation entry in the annotation knowledge base;
    dividing the script into shot units by comparing and aligning portions of each scene in the script with a corresponding shot based on aligning a transcript of the shot to the script;
    extracting an element of a plot of the video from the script, the element of the plot being derived from content of the video in combination with content of the script;
    saving the extracted element of the plot in a narrative knowledge base;
    entity-linking the object in a semantic web in the narrative knowledge base; and
    linking event units in a narrative based on an analysis of dialogue from the video and script.

2. The method of claim 1, the method further comprising preprocessing the video by:
    defining a plurality of frames of the video as standard frames;
    identifying points in the video at which a similarity between a frame and a closest standard frame have a similarity below a threshold; and
    designating the points as boundaries between a plurality of individual shots of the video.

3. The method of claim 2, the method further comprising preprocessing the script by:
    comparing a dataset of various types of script forms against a form of the obtained script;
    identifying a script form in the script form dataset as representative of the form of the obtained script;
    structuring the obtained script according to the identified script form in a script hierarchy;
    verifying that the obtained script follows the identified script form and modifying the obtained script in the case that the obtained script does not follow the identified script form; and
    detecting a plurality of scenes in the obtained script based on the structured script hierarchy.

4. The method of claim 3, the method further comprising preliminary aligning the plurality of individual shots of the video with the plurality of scenes in the obtained script.

5. The method of claim 1, wherein the annotation knowledge base comprises a semantic web comprising at least one character annotation, at least one object annotation, at least one key frame, and at least one action, and wherein the narrative knowledge base comprises a semantic web comprising at least one item of dialogue, at least one plot point, at least one character, at least one video-world location, at least one video-world action, and at least one explanation.

6. The method of claim 1, the object being at least one item recognized through an object recognition technique or at least one character recognized through a facial recognition technique.

7. The method of claim 6, the method further comprising:
    designating at least one frame in the shot as a key frame; and
    identifying the object and a position of the object in the key frame.

8. The method of claim 7, the method further comprising;
    determining an activity of the character by combining recognized actions from a plurality of shots.

9. The method of claim 1, the method further comprising:
    obtaining a structured script hierarchy in which the script is broken into scene units; and
    receiving a transcript of audio from the video divided by shot units.

10. The method of claim 9, the method further comprising:
    clustering a plurality of objects that appear together in the script into a category;
    determining a relationship between the plurality of objects based on the appearance together; and
    entity-linking the plurality of objects in a semantic web in the narrative knowledge base.

11. The method of claim 10, the method further comprising:
    analyzing dialogue from the video and script, the analysis examining at least one element of speech selected from the group consisting of: parts of speech, named entities, emotions, intent, acts of speech, tone, and honorifics;
    dividing the dialogue into event units;
    linking the event units in a narrative; and
    saving the linked narrative as narrative metadata.

12. The method of claim 1, wherein the video is a plurality of related videos and the script is a plurality of scripts, each corresponding to one video of the plurality of related videos, wherein the plurality of related videos forms at least one of the following: a television episode, a television season, a film franchise, and an opus.

13. The method of claim 1, the method further comprising hiding the element of the plot in the annotation in the case that the element of the plot includes information revealed at a later point in the video than a point in the video that is currently being viewed.

14. The method of claim 1, wherein the annotation is an interactive annotation and the annotation is displayed in response to an input from the user selecting the object in the video.

15. The method of claim 1, the method further comprising:
receiving a query about the video;
retrieving the element of the plot in response to the query; and
displaying, responsive to the query, the annotation including the element of the plot.

16. The method of claim 1, wherein the annotation includes a product offer, the product of the offer being associated with the object.

17. A computer system for automatically creating metadata for contents of a video, the computer system comprising:
a memory medium comprising program instructions;
a bus coupled to the memory medium; and
a processor, for executing the program instructions, that when executing the program instructions causes the system to:
obtain a video and a script corresponding to the video;
recognize an object in a key frame of at least one shot of the video, the shot comprising an adjacent series of frames;
extract a location corresponding to the object in the at least one shot;
interpolate a position of the object in a set of intermediary frames between two key frames or a key frame and a boundary frame of the shot;
recognize an action within the shot based on a pose or positions of an object in the shot;
save the object, position of the object, and action of the object as an annotation entry in the annotation knowledge base;
divide the script into shot units by comparing and aligning portions of each scene in the script with a corresponding shot based on aligning a transcript of the shot to the script;
extract an element of a plot of the video from the script, the element of the plot being derived from content of the video in combination with content of the script;
save the extracted element of the plot in a narrative knowledge base;
entity-link the object in a semantic web in the narrative knowledge base; and
link event units in a narrative based on an analysis of dialogue from the video and script.

18. A computer program product for automatically creating metadata for contents of a video, the computer program product comprising a computer readable hardware storage device, and program instructions stored on the computer readable hardware storage device, to:
obtain a video and a script corresponding to the video;
recognize an object in a key frame of at least one shot of the video, the shot comprising an adjacent series of frames;
extract a location corresponding to the object in the at least one shot;
interpolate a position of the object in a set of intermediary frames between two key frames or a key frame and a boundary frame of the shot;
recognize an action within the shot based on a pose or positions of an object in the shot;
save the object, position of the object, and action of the object as an annotation entry in the annotation knowledge base;
divide the script into shot units by comparing and aligning portions of each scene in the script with a corresponding shot based on aligning a transcript of the shot to the script;
extract an element of a plot of the video from the script, the element of the plot being derived from content of the video in combination with content of the script;
save the extracted element of the plot in a narrative knowledge base;
entity-link the object in a semantic web in the narrative knowledge base; and
link event units in a narrative based on an analysis of dialogue from the video and script.

* * * * *